Patented May 28, 1940

2,202,003

UNITED STATES PATENT OFFICE 2,202,003

CELLULOSIC PRODUCT AND PROCESS FOR PRODUCING SAME

Joseph F. Haskins, Hawkesbury, Ontario, Canada, assignor, by mesne assignments, to E. I. du Pont de Nemours & Company, Wilmington, Del., a corporation of Delaware No Drawing. Application June 17, 1936, Serial No. 85,823. Renewed November 15, 1938

10 Claims. (Cl. 18—54)

This invention relates to the production of cellulosic products, and it relates particularly to the manufacture of products of improved character from viscose.

In accordance with the teachings of the present invention, it has been discovered that cellulosic products, for example filaments, threads, ribbons, and film, can be greatly improved by the inclusion of de-acetylated chitin as a modifying agent. For example, cellulosic products, particularly rayon produced from viscose when modified by the inclusion of de-acetylated chitin exhibit improved dyeing characteristics, and in particular show a greatly increased affinity for acid dyestuffs.

One object of this invention relates to the production of improved cellulosic products. It is another object of the invention to produce cellulosic products having increased affinity for dyestuffs. A further object of the invention relates to the modifying of viscose, followed by coagulation and/or regeneration of the same, in order to produce regenerated cellulose, particularly in the form of filaments and threads having a greatly increased affinity for acid dyestuffs. Other objects of the invention will appear hereinafter.

The objects of the invention are accomplished according to one mode of procedure by causing de-acetylated chitin to react with carbon disulfide in the presence of an alkali until a soluble derivative is obtained, mixing the resulting compound with viscose, then casting the mixture in the usual coagulating-regenerating bath by extruding the modified viscose into the bath in any desired form, for example, through a spinneret to form filaments or through an elongated narrow orifice to form film, etc.

Chitin is a material which is present in the shells of crustacea such as shrimp, crab and lobster, and of certain insects, and after the removal of the acetate radical of the chitin, as by hydrolysis, the product which is believed to be a carbohydrate amine polymer and which is hereinafter termed "de-acetylated chitin," is capable of reacting with acid to form salt.

De-acetylated chitin may be prepared as described in the copending application of Rigby, Serial No. 731,600, filed June 21, 1934, one method of preparation being described as follows:

Shrimp, lobster or crab shells are treated first in a 1% solution of soda ash at boiling temperature for about 6 hours, after which the liquor is drained off and the shell washed with water until free of alkali as tested by phenol-phthalein. The washed shells are then subjected for a period of time to treatment with a 5% hydrochloric acid solution until all lime salts have been removed (10 to 20 hours at ordinary temperatures). After washing with water to remove the acid, the shells are given a second treatment with a 1% soda ash solution containing about 0.02% ordinary soap, the treatment being carried out at the boiling temperature of the solution for a period of about 8 hours. After this treatment the shells are drained free of the liquor and water-washed until free of alkali as tested by phenolphthalein, whereupon they are centrifuged to remove as much water as possible. The shells are then treated with 40% sodium hydroxide at 110° C. for about four hours, after which they are again water-washed until free of alkali as tested by phenolphthalein. The residue is de-acetylated chitin, is pure white, and, after drying at 65° C., may be used to prepare solutions in acid as desired.

The chitin may be partly or completely de-acetylated depending upon the conditions present during the de-acetylation. The more complete the de-acetylation, the more soluble is the salt produced by reacting with acid. Thus, the chitin from which the acetyl constituent has been completely removed, forms the most soluble salt. However, during de-acetylation, some degradation takes place and the extent of degradation increases as the de-acetylation becomes more complete. Thus, for the purposes of expediency, there must be a balance established between the completeness of de-acetylation and the degradation of the de-acetylated product. For ordinary purposes, it will be sufficient to use a product prepared from chitin which is from 85% to 90% de-acetylated. It will be understood that this range of de-acetylation is not limitative since chitin which has been de-acetylated to an extent as low as 50% or lower or as high as 100%, may be used with advantage.

The term "de-acetylated chitin," as used in the specification and claims, is intended to include the product which is prepared by removing the acetyl groups from chitin in any suitable way. Unless otherwise qualified, the term also includes the product prepared by solubilizing the de-acetylated chitin, as, for example, by forming a salt with an acid and by again insolubilizing. It is also intended to include any other products substantially identical therewith, as, for example, where such product is produced synthetically.

The de-acetylated chitin is very insoluble in water, and in the ordinary organic solvents, but it may be made soluble by causing it to react in any one of a large number of acids, including acetic, formic, citric, glycollic, malic, maleic, succinic, adipic, tartaric, benzoic, and hydrohloric acids and the like. The water-soluble salts, for example the acetate of de-acetylated chitin, upon being dried, preferably at an elevated temperature, are more or less rapidly rendered insoluble both in water and in organic solvents. In the case of salts formed by reacting with volatile acids, particularly volatile acids which are only slightly ionized, like acetic acid, the conversion to insolubility is easily and quickly accomplished since the acid, being weak and slightly ionized, is readily dissociated from its salt, and being volatile is easily removed by heat, leaving an insoluble residue. Salts formed from the non-volatile acids and/or from the highly ionized acids are much less readily converted to insolubility.

The de-acetylated product from any form of chitin may be used as a starting material. In carrying out the preparation the de-acetylated product is first dissolved in a dilute acid such as acetic and then mixed thoroughly with an aqueous solution of caustic soda. Caustic soda may be of from 2% to 50% concentration. This precipitates the de-acetylated chitin in a gelatinous form, which is pressed as free of caustic solution as possible and is then mixed with carbon disulfide at room temperature for a period of several hours until a test portion is found to be soluble in water. This requires several hours. The product without additional purification can then be dissolved in ordinary viscose.

Where the de-acetylated chitin derivative is to be used with the viscose, the reaction may be carried out most easily by mixing the de-acetylated chitin with the alkali cellulose before xanthation. This may be done by steeping undissolved de-acetylated chitin in an aqueous solution containing 18% sodium hydroxide, pressing as free of caustic as possible, and shredding into the alkali cellulose during the normal shredding operation. A somewhat more soluble product is obtained by mixing with the alkali cellulose during shredding, the de-acetylated chitin-alkali mixture described in the previous paragraph, followed by xanthation. A still different procedure is to precipitate the de-acetylated chitin from solution in acid, by means of caustic soda as described in the preceding paragraph, and then to add bulk fibrous cellulose to the slurry thus produced. This renders pressing free of excess caustic liquor much easier. Shredding and xanthation then follow. All or only part of the cellulose may be used in this step. The reaction with carbon disulfide with the mixture is normal, both a soluble cellulose xanthate and a soluble de-acetylated chitin derivative being obtained.

The de-acetylated chitin derivative-viscose mixture possesses generally the characteristics of a normal viscose. It filters without difficulty and ripens normally. It may be spun without ripening or at any degree of ripeness into any of the customary acid spinning baths used in the viscose process. Both very high and low acid concentration in the bath regenerates the de-acetylated chitin derivative in the form of its salt, e. g., de-acetylated chitin sulfate where a sulfuric acid bath is used to coagulate and regenerate the viscose. Any of the customary spinning processes may be used. By suitable application of tension during spinning, high tenacity of good physical properties is obtained without trouble.

The quantity of de-acetylated chitin introduced into the viscose may be varied over wide limits. As little as 0.01% by weight (based on the weight of the cellulose) gives a noticeable effect, while as much as 25% or more by weight (based on the weight of the cellulose) can be added and the mixture regenerated to form useful products.

The dyeing characteristics of the yarn are changed markedly, particularly with acid dyestuffs. Pontacyl Fast Blue R (color index 208), an acid dyestuff principally applicable to animal fibers which require the bath to be in an acid condition to secure an economical exhaustion of the dyestuff when applied to wool, gives full strength dyeing of a viscose yarn containing 10% de-acetylated chitin, but shows no affinity for ordinary viscose yarn. With 1% de-acetylated chitin, the yarn dyes approximately 50% of full strength.

The following examples which are illustrative but not limitative of the invention, are given to describe specific forms in which the invention can be applied.

*Example I*

140 parts of a 5% solution in 2% acetic acid, of de-acetylated chitin obtained from shrimp shells was poured slowly into 280 parts of a 27% aqueous solution of sodium hydroxide with vigorous agitation. The precipitated de-acetylated chitin was pressed as dry as possible, after which it weighed 140 parts.

700 parts of air dried cotton linters was steeped in 19% aqueous solution of sodium hydroxide and then pressed to 1900 parts. 320 parts of this alkali cellulose was shredded with the de-acetylated chitin-alkali mixture for two hours and the shredded mass then added to the remainder of the alkali cellulose, and the two shredded together for two more hours. The material, after aging 24 hours at 25° C., was xanthated with 35% carbon disulfide (based on the weight of the cellulose), dissolved in 6% aqueous solution of sodium hydroxide to a 6.93% cellulose and 0.07% de-acetylated chitin solution, mixed, filtered and ripened for 60 hours at 18° C. It was spun through a spinneret into an aqueous bath containing 10% sulfuric acid, 18% sodium sulfate, and 3% glucose, and washed before drying with ammonia water. It gave a yarn of good physical properties, showing high affinity for acid dyestuffs. The finished yarn contained about 1% de-acetylated chitin.

*Example II*

800 parts of sodium hydroxide was dissolved in 2640 parts of water. After cooling, to this was added 1600 parts of a 5% solution of de-acetylated chitin in 2% acetic acid. The mixture was stirred slowly to break up lumps and then 70 parts of cotton linters was stirred into the mixture. After one-half hour the product was placed in a press cylinder and pressed to 850 parts. The product was added in a shredder to alkali cellulose prepared by steeping 800 parts of cotton linters in 19% aqueous solution of sodium hydroxide and pressing them to 2400 parts. The alkali cellulose-de-acetylated chitin mixture so produced was xanthated with 35% carbon disulfide, mixed with an aqueous solution containing 6.5% caustic soda to a concentration of 6.3% cellulose and 0.7% de-acetylated chitin, filtered, ripened for 48 hours at 20° C., and then spun into an aqueous bath containing 10% sulfuric acid, 18% sodium sulfate, 3% glucose, and 1% zinc sulfate and washed before drying with ammonia water. The yarn had the same physical properties as those of a yarn prepared by spinning viscose under the same conditions, but presents an unusual affinity for acid dyestuffs when dyed from acid baths. The finished yarn contained approximately 10% de-acetylated chitin.

*Example III*

This example was carried out in the same way as Example I except that the thread was guided through the bath by means of roller guides having vanes on their undersides to resist rotation, and thereby to impart high tension to the yarn traveling over the guides. The yarn had a dry tenacity at 75° F. of over 2 grams per denier, and its behavior with acid dyestuffs was the same as the product of Example I.

*Example IV*

To a solution of 5 parts of de-acetylated chitin (of 10 poise viscosity as measured in 5% solution in 1.5% acetic acid) dissolved in 95 parts of 1.5% acetic acid, was added 6.3 parts of carbon disulfide and the mixture stirred to a homogeneous emulsion. Then 25 parts of an aqueous 40% sodium hydroxide solution was added slowly and stirring continued for 4 hours. This gave a deep red viscous solution, part of which was poured on a glass plate and dried with a stream of air to give a tough, pliable film. The film was extracted with methanol to remove colored by-products. This left the film opaque but colorless. A portion of this film was stirred with water to a viscous solution, which was poured onto a plate and dried to a clear, transparent, tough and flexible film. The material was dissolved in water, mixed with viscose to give 0.35% de-acetylated chitin derivative, and 6.65% cellulose and after filtering and ripening was spun into a bath containing 9% sulfuric acid, 15% sodium sulfate, 3% glucose, and 1% zinc sulfate. The yarn was washed, before drying, with aqueous ammonia, yielding a yarn with increased affinity for acid dyestuffs. The same result was obtained by mixing the unpurified de-acetylated chitin-carbon disulfide reaction mixture with the viscose.

While it is not desired that this invention be limited by theory, it is believed that the reaction product of carbon disulfide with de-acetylated chitin in the presence of caustic soda is a thiocarbamate salt derived from the free amino group of the de-acetylated chitin. The product is considerably more stable than viscose, and is not believed to be a xanthation product.

The product produced by the practice of this invention may be in the form of films, filaments, threads, ribbons, straw, etc., the form in which it is produced depending upon the use to which the products are to be put, the de-acetylated chitin being homogeneously and intimately admixed with and uniformly dispersed throughout the mass of the cellulosic material. Rayon produced in accordance with this invention exhibits very good dyeing characteristics as far as acid dyestuffs are concerned, and mixtures of the yarn with ordinary viscose rayon yield unusual cross-dyeing effects with acid dyestuffs.

While the invention is of primary importance because of the improved dyeing characteristics of the novel products, other advantages follow from the practice of the invention. For example, the present invention may be applied to the production of moistureproof, thin, flexible transparent, non-fibrous regenerated cellulose film adapted for use as wrapping tissue in which the base film and the moistureproof coating exhibit improved adhesion towards each other. Moistureproof coatings applied to regenerated cellulose film do not normally adhere well to the base film when used under conditions where the coated film is subjected to the action of water. It has been suggested that the moistureproof coating be anchored to the base by means of an intermediary anchor coat. Regenerated cellulose film containing de-acetylated chitin and cast from viscose containing the de-acetylated chitin-carbon disulfide reaction product, when coated with a moistureproof coating, exhibits a greatly improved anchorage of coating to base.

*Example V*

The filtered and ripened viscose-de-acetylated chitin derivative prepared according to the method of Example I, was cast through a conventional film casting hopper into a conventional acid coagulating bath normally used for the coagulation and regeneration of viscose to form film, the film being desulfured, bleached, washed and dried in the same way as normal regenerated cellulose film prepared from viscose except that it was washed before drying with aqueous ammonia. The dried film was coated with a moistureproofing lacquer, for example, a lacquer of the character described in Charch and Prindle U. S. Patent No. 1,737,187, issued November 26, 1929. The moistureproof regenerated cellulose film containing approximately 1% de-acetylated chitin, exhibited greatly improved adhesion of coating to base even when subjected for a long period of time to immersion in water.

*Example VI*

The same procedure was followed as described in Example V, except that the viscose-de-acetylated chitin derivative solution of Example II was used in place of the viscose-de-actylated derivative solution of Example I, the moistureproof film containing approximately 10% de-acetylated chitin. The anchorage of the coating to the base was somewhat better than that of the film prepared according to Example V.

Not only does the presence of de-acetylated chitin in regenerated celulose film improve anchorage of coatings thereon but the presence of de-acetylated chitin in other regenerated cellulose structures such as threads also improves anchorage or adhesion of materials thereto. For instance when de-acetylated chitin is incorporated in viscose rayon in accordance with this invention and the yarn used in reinforcing rubber articles such as automobile tires the adhesion of the rayon to the rubber is improved.

The present invention is particularly concerned with improving regenerated cellulose obtained from viscose. Broadly speaking, however, the invention may be similarly applied to aqueous cellulosic solutions other than viscose which are spun, cast or extruded into acid coagulating baths, for example, cuprammonium cellulose solutions, and aqueous solutions of lowly etherified and lowly esterified cellulose, such as lowly etherified methyl, ethyl and glycol cellulose and lowly esterified cellulose acetate.

In place of sodium hydroxide, the other alkali metal hydroxides such as potassium hydroxide, may be used.

The parts and proportions given above are intended to be parts and proportions by weight unless indicated otherwise.

Since the invention is capable of considerable modification, any departure from the above specific description and examples which conforms to the spirit of the invention is intended to be included in the scope of the claims.

I claim:

1. A composition of matter comprising an aqueous cellulosic solution containing a carbon disulfide derivative of de-acetylated chitin.

2. A composition of matter comprising viscose containing a carbon disulfide derivative of de-acetylated chitin.

3. In the process of producing cellulosic products from solution, the steps which comprise making up a viscose containing a carbon disulfide derivative of de-acetylated chitin and forming articles therefrom by coagulation, the said coagulation causing a change in the composition of the said chitin material.

4. In the process of producing cellulosic products from solution, the steps which comprise making up a viscose containing a carbon disulfide derivative of de-acetylated chitin and forming articles therefrom by coagulation in an acid bath, the said coagulation causing a change in the composition of the said chitin material.

5. In the process of producing cellulosic products from solution, the steps which comprise making up a viscose containing a carbon disulfide derivative of de-acetylated chitin and forming articles therefrom by coagulation in an acid bath, then treating said articles to form de-acetylated chitin.

6. In the process of producing cellulosic products from solution, the steps which comprise making up a viscose containing a carbon disulfide derivative of de-acetylated chitin and forming articles therefrom by coagulation in an acid bath, then treating said articles to form de-acetylated chitin by an alkaline treatment.

7. In the process of producing cellulosic products from solution, the steps which comprise making up a viscose containing a carbon disulfide derivative of de-acetylated chitin and forming articles therefrom by coagulation in an acid bath, then treating said articles to form de-acetylated chitin by an alkaline treatment and dyeing with an acid dyestuff.

8. The process which comprises adding alkali to an aqueous solution of a de-acetylated chitin salt, reacting with carbon disulfide, and forming an aqueous cellulosic solution containing the product of said reaction intimately admixed therewith.

9. The process which comprises adding alkali to an aqueous solution of a de-acetylated chitin salt, reacting with carbon disulfide, and forming a viscose containing the product of said reaction intimately admixed therewith.

10. The process which comprises adding caustic soda to an aqueous acetic acid solution of de-acetylated chitin, commingling the product with alkali cellulose, and reacting the mixture with carbon disulfide.

JOSEPH F. HASKINS.